Feb. 28, 1950 W. SAVILLE ET AL 2,498,899
ELECTRICAL SIGNALING SYSTEM
Filed Aug. 27, 1945
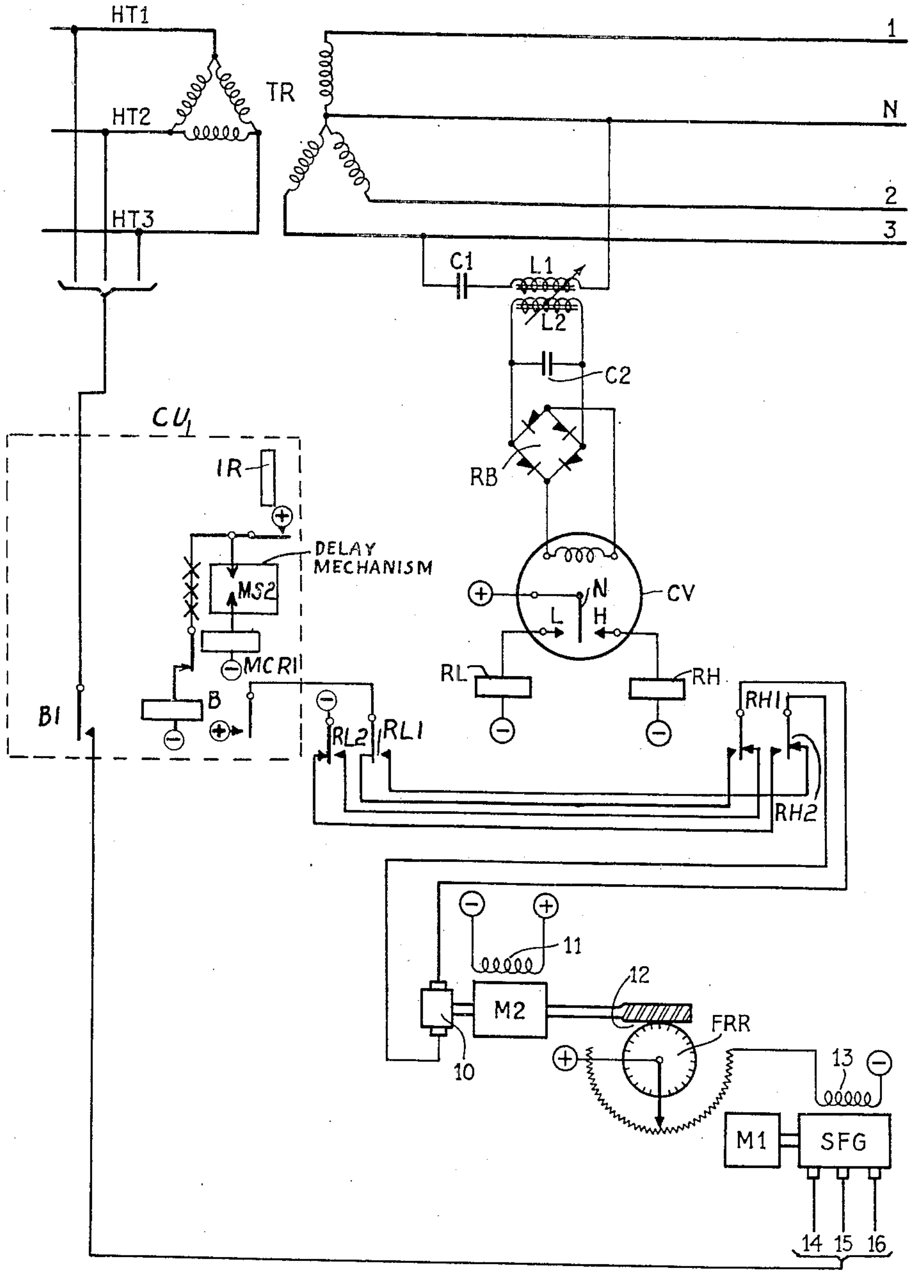
INVENTORS
WILLIE SAVILLE
PHILIP NORTON ROSEBY
BY Chas. W. Canby
ATTORNEY Patented Feb. 28, 1950 2,498,899

UNITED STATES PATENT OFFICE 2,498,899

ELECTRICAL SIGNALING SYSTEM

Willie Saville and Philip Norton Roseby, Liverpool, England, assignors to Automatic Electric Laboratories Inc., Chicago, Ill., a corporation of Delaware Application August 27, 1945, Serial No. 612,934
In Great Britain September 20, 1944

2 Claims. (Cl. 171—97)

The present invention relates to electrical signalling systems, and is more particularly concerned with systems of the type in which signalling is effected by the use of high frequency currents superimposed on electric power systems, the high frequency current serving to operate a plurality of responding devices connected to the power distribution circuit at different points. The expression "high frequency currents" as used herein implies that the currents concerned are of a frequency which is high compared with the frequency of the power system, for instance audio frequency, and is not intended to be limited to high frequency currents as normally understood in the radio art.

The invention finds particular application to systems of the type disclosed in British Specification No. 525,840 in which the signals consist of current of a particular high frequency interrupted at a different low frequency rate and the responding units, which are all electrically tuned to the same high frequency, are selectively mechanically tuned to the various low frequencies which distinguish the different signals. Suitable central station control and signal generation equipment for a system of this type is disclosed in John F. Mackenzie's Patent No. 2,395,132. The equipment covered by the above mentioned patent is represented by the rectangle CU on the associated drawing.

When an electric power system has a high frequency signal superimposed upon it on a so-called parallel injection basis, the value of the superimposed voltage will be reduced with increase of the power system's load. This is undesirable because under conditions of light load the voltage of the superimposed signal may reach such a high value as to cause some transfer into adjacent networks and such leakage may be of sufficient magnitude to cause false operation of the signal responding devices connected to these networks.

According to the present invention this possible difficulty is avoided by providing arrangements for automatically regulating the voltage of the superimposed H. F. signal in accordance with the load conditions on the portion of the network to which the responding devices are connected.

The invention will be better understood from the following description of one method of carrying it into effect, reference being had to the accompanying drawing which shows the essential circuit connections of equipment for automatically regulating the voltage of a high frequency signal which is superimposed upon power system.

Referring now to the accompanying drawing, the rectangle SFG represents the signal generator which comprises a three-phase alternator, which is driven from a motor M1 and which serves to superimpose three-phase signalling currents via leads 14, 15 and 16 upon the conductors HT1, HT2 and HT3 of the high tension or primary side of the power supply network.

The high frequency signals on the primary network will extend by way of transformers, such as TR, on to the low tension or secondary networks supplied therefrom, the three-phase four-wire secondary network is shown having phase leads which are designated 1, 2 and 3, and a neutral lead which is designated N. On the secondary networks potential differences at signal frequency will appear between the various phase leads and the neutral lead and hence the available signal energy for operating the signal responding devices, not shown, which are usually connected between a phase lead and the neutral lead, will also be shared by the supply loads also connected across these leads so that the available line signal voltage will thus be reduced as the power load increases.

Between any one of the phase leads 1, 2 or 3 and the neutral lead N of the secondary network, a contact making voltmeter CV is connected by way of a bridge rectifier feeding circuit RB, together with a filter circuit, including capacitors C1 and C2 and loosely coupled iron-cored inductors L1 and L2, tuned to the superimposed signal frequency concerned. The high and low voltage contacts H and L of the voltmeter CV respectively connect with relays RH and RL, each of which has two changeover contact sets RH1—RH2 and RL1—RL2, by means of which a field-regulating rheostat FRR can be driven forwardly or backwardly by a reversible direct current motor M2 via a reduction gear 12 so as to increase or decrease the output voltage of the signal frequency generator SFG by varying current flow through the field winding 13.

With the superimposed voltage at the normal predetermined value both the voltmeter needle N and the rheostat FRR will occupy the positions shown on the drawing.

As previously mentioned, the rectangle CU represents the control unit corresponding to the aforementioned Mackenzie patent and for simplification only the mechanical locking relay 1R, the delay mechanism and one of the MCR1—MCR4 relays of this patent are shown. In the Mackenzie Patent 2,395,132, when it is desired to operate one of the responding devices connected to the power line, a corresponding push button is operated to cause the finder switch FA to find the operated push button which causes the operation of the two coil mechanical locking relay 1R. This relay in operating starts the starting equipment ASE, the motor MS of the delay timing mechanism, and the signal source motor ACM for driving the signal alternators ATR1—ATR4. The delay timing mechanism provides a period of time in the order of twenty seconds to allow the motor alternator set, driven by ACM, to reach its signalling speed. After the motor MS of the delay mechanism has run for 20 seconds the contacts MS2 are closed to complete the signalling circuits to thereby transmit the proper code for operating the desired responding device. Also, shown in Fig. 4 of this patent is a field regulator PG for regulating the current flow to the stator windings of the four alternators.

The present invention is designed to work with the transmitting system shown in the above mentioned Mackenzie patent. When the mechanical locking relay 1R in the Mackenzie patent is operated the motor MS is started and a circuit is closed at the contacts of relay 1R, and through a chain of normally closed contacts on the MCR1—MCR4 relays (Fig. 4) of the Mackenzie patent to relay B. Relay B operates and closes its contacts B1 to connect the high frequency output of generator SFG over conductors 14, 15 and 16 to leads HT1, HT2 and HT3. The output from generator SFG is connected to the conductors HT1, HT2 and HT3 as soon as relays 1R and B operate and remain connected for a period of 20 seconds until motor MS has operated contacts MS2. The operation of contacts MS2 completes a circuit for operating one of the MCR1—MCR4 relays, or relay MCR1 as shown in the drawing. The operation of this latter relay opens the chain circuit to relay B which then restores to disconnect the output of the generator SFG from the leads HT1, HT2 and HT3. The output of generator SFG is therefore connected to the power leads for a sufficient time, that is, for a period of twenty seconds, to enable the output of the generator SFG to be increased or decreased as desired, dependent upon the load on the power network. It should also be mentioned that the motor M2 and reduction gear 12 also controls the field regulator PG (Fig. 4) of the Mackenzie patent in the same manner as the gear 12 controls the arm of the rheostat connected to the field winding 13 of generator SFG. In this manner the field regulator PG is operated by motor M2 and gear 12 to increase or decrease the current flow to the stator windings of the alternators ATR1—ATR4 of the Mackenzie patent in accordance with the load on the power network so that the proper signalling current is transmitted.

If the induced high frequency voltage falls due to an increase in the secondary network load, the voltmeter needle N will connect with contact L and operate relay RL, whereupon at contacts RL1 and RL2 the armature winding of the motor M2 will be energised via the commutator 10 in such direction relative to the field winding 11 that the arm of the rheostat FRR will be rotated in a counterclockwise direction and this will continue until the resultant increased output voltage of the generator SFG restores the line signal voltage to its proper value whereupon the voltmeter needle will restore to normal and relay RL will release. The above circuit for the energization of the armature winding of motor M2 is as follows: positive battery at contacts B2, make contacts RL1, back contacts RH2, commutator 10 and armature winding of motor magnet M2, back contacts RH1, make contacts RL2 to negative battery. The above adjusting of the generator SFG takes place during the predetermined period that relay B is energized, and this splash of high frequency signalling current on the secondary of the network will have no effect on the responding devices connected thereto. After the end of the predetermined period of energization of relay B its circuit will be opened and it will deenergize thereby removing the high frequency signalling current from the power system at contacts B1. The voltage of the signal generator SFG has now been adjusted to its normal value in respect to the system load. The release of relay B at contacts B2 opens the circuit of motor M2, thereby preventing further operation of the rheostat FRR. The pulsing relays such as MC1—MC4 of the Mackenzie patent, will now be pulsed a certain number of times at a rate corresponding to the responding device to be operated, which is connected to the secondary network.

Similar considerations apply if the superimposed potential rises, in which case upon the seizure of the control unit CU and the first operation of relay B, the voltmeter needle N will connect with contact H, thereby, relay RH will be operated and at its contacts RH1 and RH2 serves to drive the motor M2 and the rheostat FRR coupled thereto in the reverse direction from that mentioned above until such time as normal line voltage conditions are restored. The path for driving the motor M2 in a clockwise direction is as follows: positive battery at contacts B2, back contacts RL1, make contacts RH1, armature 10 of motor M2, make contacts RH2, back contacts RL2, to negative battery.

While certain embodiments of the invention have been described, it will be obvious to those skilled in the art that changes and modifications may be made therein and consequently the appended claims are aimed to cover all such changes and modifications as fall within the true spirit and scope of the invention.

What is claimed as new and desired to secure by Letters Patent is:

1. In an electrical signalling system employing high frequency currents superimposed on a low frequency electric power network in order to operate a plurality of responding devices connected thereto, said electric power network comprising a primary network and a secondary network inductively coupled together, a control unit, a generator for producing said high frequency currents, means controlled by said control unit for connecting the output of said generator to said primary network, a contact making voltmeter, a condenser and inductance coupling unit, tuned to said high frequency, connected to said secondary network, a rectifier bridge connecting said voltmeter to said coupling unit, a rheostat for adjusting the output voltage of said generator, a reversible motor actuating said rheostat, and means controlled by said voltmeter for operating said motor in a direction to adjust the output of said generator dependent upon the secondary network load when the output of said generator is connected to said primary network by said control unit.

2. In an electrical signalling system employing high frequency currents superimposed on an electric supply network supplying power at a frequency lower than said first frequency in order to operate a plurality of responding devices connected thereto, said supply network comprising a primary network and a secondary network inductively coupled together, a control unit, a generator for producing a potential at said first frequency, said control unit connecting the output of said generator to said primary network, a contact making voltmeter, a tuned circuit comprising a condenser and inductance tuned to said first frequency and connected to said secondary network, a rectifier connected to said voltmeter, a coupling unit coupled to said tuned circuit for controlling the operation of said rectifier to control said voltmeter, a rheostat for controlling the output potential of said generator actuated by a reversible motor and means controlled by the operation of said voltmeter to actuate said motor to vary the potential of said high frequency currents.

WILLIE SAVILLE.
PHILIP NORTON ROSEBY.

REFERENCES CITED

The following references are of record in the file of this patent:

UNITED STATES PATENTS

| Number | Name | Date |
|---|---|---|
| 706,575 | Lunt | Aug. 12, 1902 |
| 1,674,757 | Bates | June 26, 1928 |
| 1,710,755 | West | Apr. 30, 1929 |
| 1,746,756 | Ashbaugh | Feb. 11, 1930 |
| 1,822,439 | Hahnemann et al. | Sept. 8, 1931 |
| 1,943,524 | Godsey, Jr. | Jan. 16, 1934 |
| 1,981,040 | Gulliksen | Nov. 20, 1934 |
| 2,046,696 | Nycum | July 7, 1936 |
| 2,109,215 | Harder | Feb. 22, 1938 |
| 2,136,248 | McLachlen | Nov. 8, 1938 |
| 2,141,489 | Roseby | Dec. 27, 1938 |
| 2,395,132 | Mackenzie | Feb. 19, 1946 |